United States Patent [19]

Fauconnet

[11] 4,186,555
[45] Feb. 5, 1980

[54] HYDRAULIC MACHINE

[75] Inventor: Michel Fauconnet, Marchissy, Switzerland

[73] Assignee: Ateliers des Charmilles, S.A., Geneva, Switzerland

[21] Appl. No.: 919,959

[22] Filed: Jun. 28, 1978

[30] Foreign Application Priority Data

Jul. 18, 1977 [CH] Switzerland .......................... 8854/77

[51] Int. Cl.² ............................................ F16D 33/00
[52] U.S. Cl. ...................................... 60/330; 415/500
[58] Field of Search ................... 60/330, 334; 415/93, 415/95, 500

[56] References Cited

U.S. PATENT DOCUMENTS

| 2,996,995 | 8/1961 | Culaud ........................... 60/330 UX |
| 3,897,167 | 7/1975 | Fauconnet ......................... 60/330 X |
| 4,008,010 | 2/1977 | Fauconnet ........................ 415/500 X |

Primary Examiner—Edgar W. Geoghegan
Attorney, Agent, or Firm—Emory L. Groff, Jr.

[57] ABSTRACT

A hydraulic machine including a turbine and a pump oriented for the same direction of rotation and axially spaced apart on a common shaft, and having a casing extending between the external turbine strut ring and the external pump strut ring in which a pump inverter is housed, the casing having an internal separating wall dividing it into two chambers, into one of which the pump inverter discharges.

7 Claims, 15 Drawing Figures

HYDRAULIC MACHINE

The present invention relates to a hydraulic machine including a turbine and a pump aligned for the same direction of rotation and comprising a single casing connected to the upstream inlet pipe, a gate being interposed between the turbine wheels and the pump wheels, these being mounted, spaced one from the other, on a common shaft, and their respective inlets being oriented in opposed directions.

The hydraulic machine is of the type known under the name ISOGYRE (Registered Trade Mark) adapted for the transfer of energy by turbo-pumping.

In such machines, gates are interposed between the volute on each of the two wheels. Draining devices permit emptying, then refilling, one or other of these wheels, after opening of the corresponding gate.

These turbo-pumps always start in turbine conditions. After the coupling of their alternator motor on the electric network, the subsequent changes in condition are effected solely by manipulation of the gates and of the emptying devices.

The single direction of rotation of such a machine is made possible, despite the presence of a single volute, thanks to the use of inversion channels, the function of which consists in changing the direction of the tangential component of flow between the volute and one or other of the two wheels. There can be used either "turbine inverter", inserted between the volute and the turbine wheel, or a pump inverter inserted between the pump wheel and the volute.

Up to now, the development of these ISOGYRE turbo-pumps has led to two generations of different industrial embodiments being distinguished one from the other mainly by the localisation and the conception of the inverters.

In the Isogyres of the first generation, turbine wheels and the pump wheels are united one with the other and have a common central joint, their inverter being situated inside the space comprised between the periphery of the two wheels and the volute surrounding them.

In this restricted space, the slowed down flow of fluid travelling through an inverter constituted by struts necessarily too inwardly curved by reason of the small available space, presents phenomena of detachment and of counter current occasioning inadmissible losses of energy. This is the reason for which the use of a turbine inverter formed of incurved struts run over by an accelerated flow is imposed for Isogyres of this generation, and not by a pump inverter.

The recognised necessity for improving as much as possible the turbine yield, in avoiding the use of a turbine inverter, has led to the development of second generation Isogyres.

In these latter, turbine wheels and the pump wheels have been axially spaced one from the other so as to provide the necessary space for substantially rectilinear pump defusers and a pump inverter the layout of which is made sufficiently progressive to avoid the energy losses previously ascertained.

Additionally, this arrangement presents also other advantages: It renders possible the reduction in the axial forces in permitting an individual dimensioning of the central joint of the two wheels. The evacuation of the leakages of these joints is facilitated. A guide bearing can be inserted between the two wheels.

The characteristic determining the Isogyres of the second generation resides in the fact that the pump defusers, likewise a substantial fraction of the pump inverter is situated outside the space defined by the periphery of the turbine wheel and the external face of the common volute surrounding the said wheel.

Despite the progress brought by the Isogyres of the second generation, these machines also present several inconveniences, whatever be the form.

In one arrangement, the pump inverter is constituted by an appropriate partitioning of the central body of the machine. The required construction imposed by the strong mechanical forces undergone by this part have resulted, in execution, to the adoption of reversing channels which are too narrow and sinusoidal, so that the advantages attained with this solution have been partially compromised. Moreover, such a pump inverter is heavy and of very costly manufacture.

In another arrangement, the pump wheel discharges in numerous extended partial volutes by diffusers and separate conduits constituting the inverter. These conduits are connected obliquely to the wall of the common volute. Whilst being less sinusoidal, such inverters are still too long and their loss of energy by friction remains notable. Moreover, they weaken the wall strongly acted upon of the communal volute, by virtue of several eliptical openings. The addition of reinforcing grooves is indispensable for reducing this fault, but these are expensive; the obliquity of the connections of these tubes can be reduced, which has the result of increasing the loss of energy due to the inverter.

The object of the present invention is to remedy these inconveniences by a new localisation of the pump inverter making its manufacture less difficult and its yield higher.

According to the present invention there is provided a hydraulic machine having a turbine and a pump orientated for the same direction of rotation and comprising a casing connected to an upper inlet pipe, blades interposed between the casing and the turbine and pump wheel, the turbine and the pump being mounted, spaced one from the other, on a common shaft, and their respective inlets being orientated in opposite directions, and including a pump inverter housed at least partially inside the casing and provided with an internal separating wall dividing it into two chambers, one of which constitutes the volute of the turbine in which the pump inverter discharges.

The present invention will be described further, by way of example, with reference to the accompanying drawings, in which.

Figure 1:
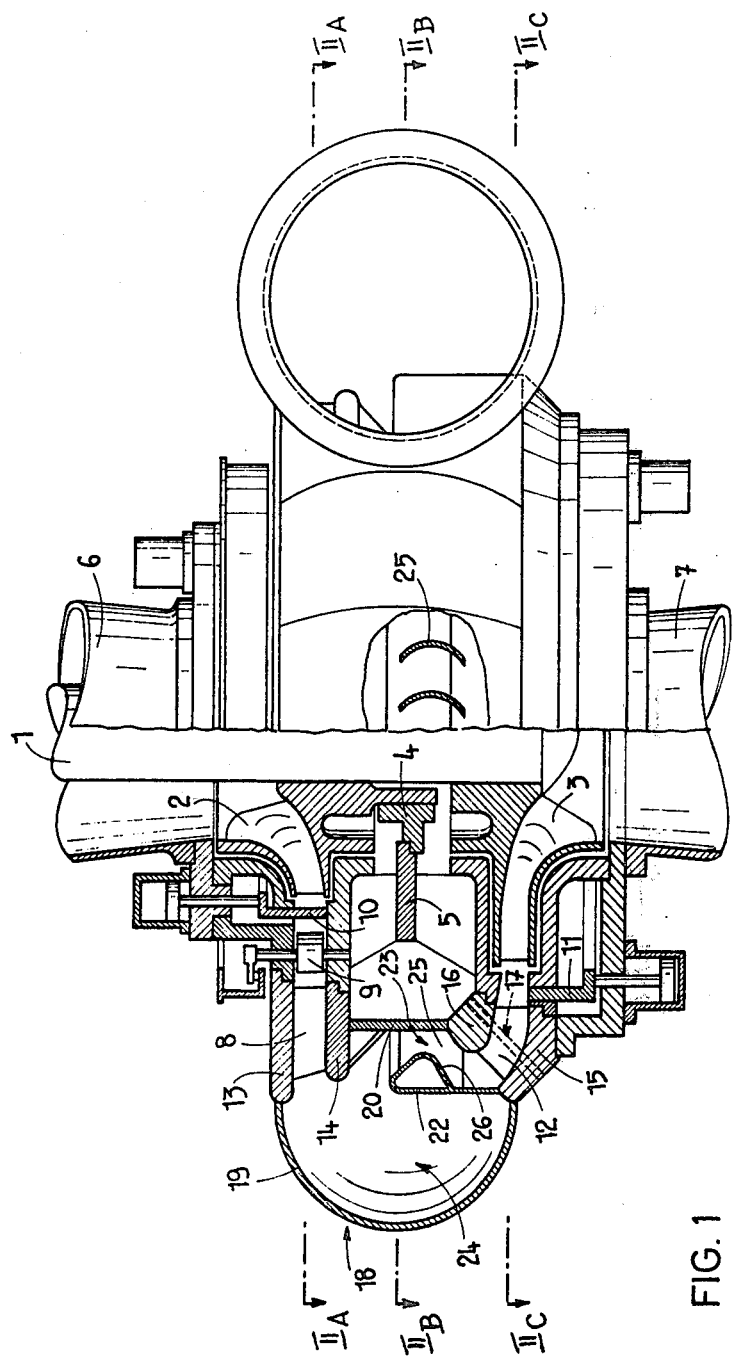
FIG. 1 is a view, partially in axial section along the line I—I of FIG. 2, and partially an elevation, of a hydraulic machine.
Figure 2:
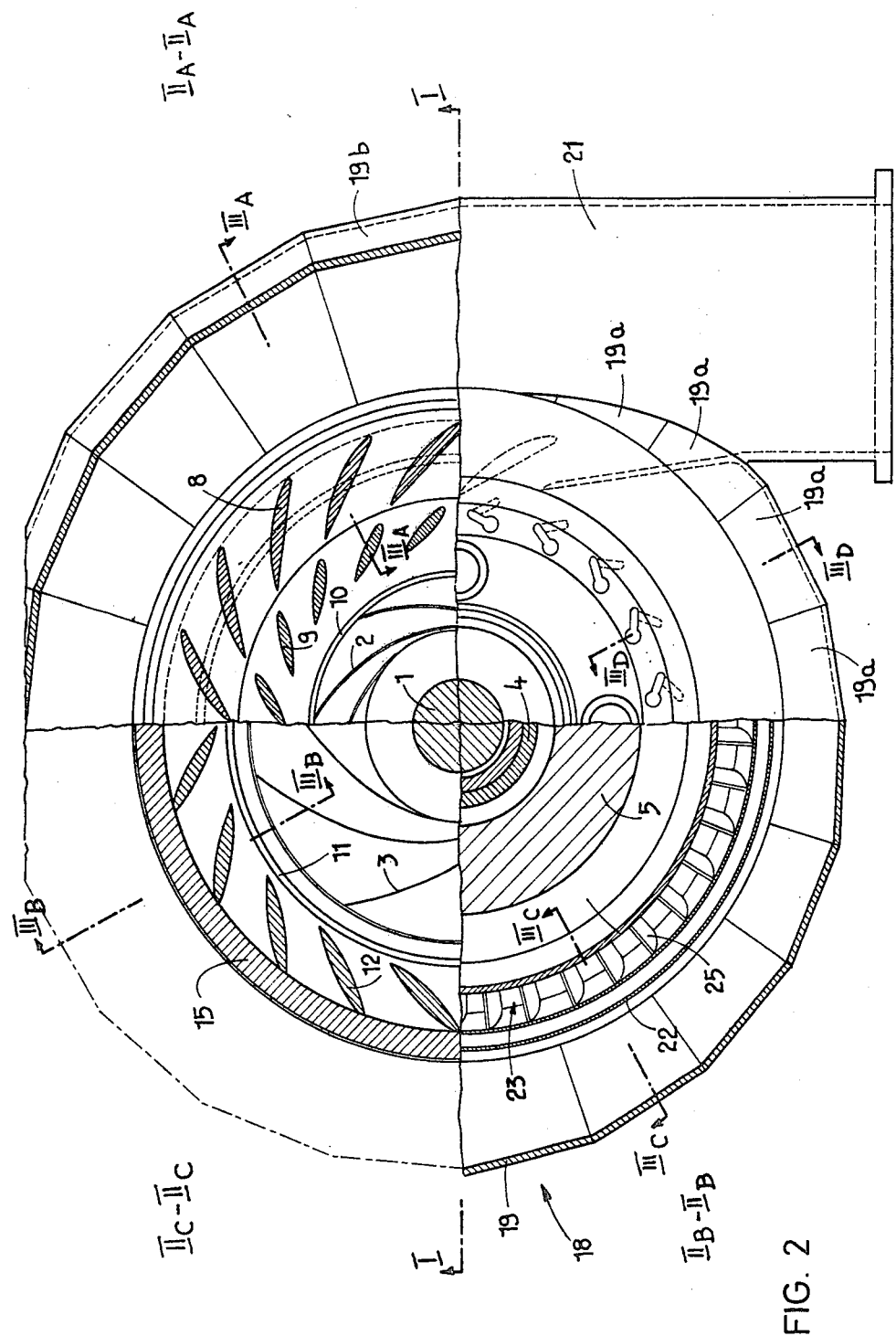
FIG. 2 is a view, showing respective transverse cross-sections on lines $II_A$—$II_A$, $II_B$—$II_B$, and $II_C$—$II_C$ of FIG. 1.
Figure 3A:
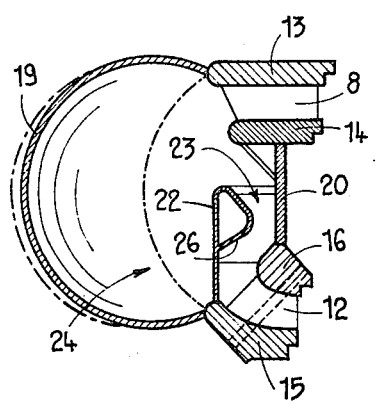
FIGS. 3A to 3D are respectively axial sections along the lines $III_A$—$III_A$, $III_B$—$III_B$, $III_C$—$III_C$ and $III_D$—$III_D$ of FIG. 2.
Figure 3B:
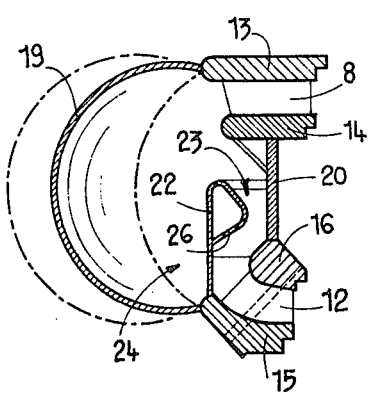
Figure 3C:
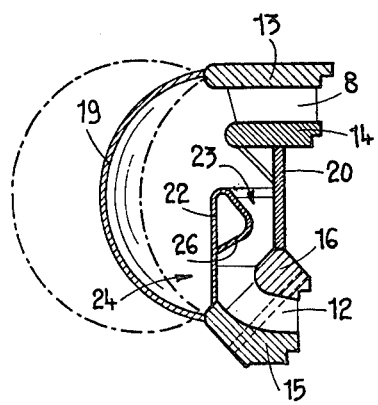
Figure 3D:
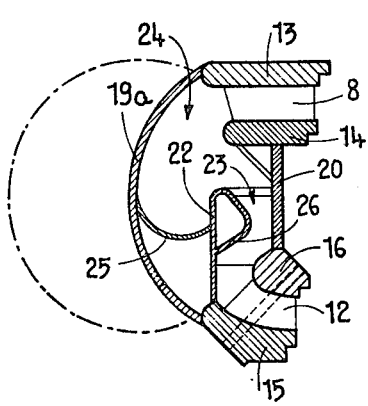

The machine of FIGS. 1, 2 and 3 comprises a shaft 1, vertical in the example shown, but which could have another position, horizontal for example.

A turbine wheel 2 and a pump wheel 3, orientated for the same direction of rotation, are mounted axially spaced one from the other on a common shaft 1. A guide bearing 4, mounted on a central body 5 of the machine, is interposed between the two wheels 2 and 3. The pump wheel 3 is mounted overhanging on the shaft 1. This could also be of the traversing type, guided by bearings exterior to the wheels of the machine.

The turbine inlet 6, and the inlet elbow 7 of the pump are orientated in opposed directions.

A ring of turbine struts 8 and orientatable guide blades 9 have the usual layout for this type of machine. A cylindrical gate valve 10 permits the control of the flow to the turbine wheel 2.

The cylindrical gate 10 is inserted between the periphery of the turbine wheel 2 and the guide blades 9. It could also be interposed between the guide blades 9 and the ring of struts 8. This gate could even be omitted in the case where the guide blades can provide a perfectly watertight closure.

A cylindrical gate 11 is provided at the periphery of the pump wheel 3, between this and a circle of strut 12 of the pump. An orientatable pump diffuser could also be added. The diffuser effect is mainly ensured by the pump struts 12, of conventional layout, substantially rectilinear, in the neighbourhood of the wheel.

The turbine struts 8 are inserted between an external turbine strut ring 13 and an internal turbine strut ring 14. Similarly the pump struts 12 are inserted between an external pump strut ring 15 and an internal pump strut ring 16. These various strut rings can be of differing forms and diameters.

Channels 17 through between the pump struts 12 and between external strut ring 15 and internal strut ring 16, ensure the extraction of leakage water of the internal hydraylic joints of the two wheels and various other functions.

A casing 18 is wound around the machine, and a cursory examination of this leads to mistake this casing 18 for an ordinary spiral turbine case, however, it is distinguished by several essential characteristics:

The casing 18 comprises an exterior wall formed of sleeve sections 19 welded one to the other, which connect the external turbine strut ring 13 to the external pump strut ring 15, whilst an internal wall 20 connects the internal turbine strut ring 14 to the internal pump strut ring 16.

The sections 19 of the outer wall of the casing are in the form of segments of a circle; they are symmetrical because the strut support rings 13 and 15 to which they are attached are of the same diameter. But they would be asymmetric if they were attached to external strut rings of different diameters.

The sections 19 of the outer wall of the casing 18 wind in a spiral form only for a part of the periphery of the machine. Within certain limits, these sections 19$a$ (FIG. 2), are substantially identical to each other. They are then wound around following a polygon enscribed in a circle the centre of which coincides with the axis of the machine.

If the identical sections 19$a$ came to form segments of a circle of too small a diameter, their form could be modified in rounding off their ends in the region of their connections with the strut rings, so as to reduce the mechanical forces effected by the loading, according to the technique used for the bases of boilers.

The entry section, designated by 19$b$ (FIG. 2), the largest of all, is connected to the input tube 21 of the casing 18. The similar sections 19$a$ constitute the sections of weakest part of the casing 18.

The boundary between the sleeve sections rolled spirally and those rolled in a circle is determined by energy considerations. In effect, the sections of small diameter form, by reason of the spacing of the strut rings 13 and 15 to which they are attached, very flat segments of a circle (FIG. 3D), the hydraulic radius of which is unfavourable and effects, consequently the yield of the machine. The position of this boundary is thus situated between the two extreme cases, equally possible where all the sections are rolled spirally, on the one hand, and the one where all the sections are rolled in a circle, on the other hand.

The internal wall 20 of the casing is constituted by a cylinder which is attached by its two ends to the internal strut rings 14 and 16 of the turbine and the pump respectively. This wall also could be in conical form. It could likewise be constituted by sections welded one to the other, in the form of segments of circles or any other form according to the mechanical requirements imposed by the loading of the machine.

Various guide walls are housed inside the casing 18, namely, on the one hand, a separating wall 22, separating the space occupied by a pump inverter 23 from the space 24 constituting the volute of the machine, and on the other hand, a connecting wall 25 (FIG. 3D) inserted only in the part of the casing 18 constituted by the small identical sections 19$a$ of constant diameter. The function of the wall 25 is to separate the space occupied by the volute 24 from the dead space which constitutes the remainder of the section of the casing and ensures, thereby, the continuity of the evolution of the section law of the volute, required for the correct supply of the turbine wheel and consequently for the correct functioning of the machine.

The separating wall 22 avoids the local discontinuities of form or of section which could result from the fact that the pump inverter 23 is housed in the casing 18.

The separating wall 22 and connection wall 25 could have very different forms and the drawings thereof only give several non-limitative examples.

Equilibrium openings not shown, are provided in the wall 25, which ensure, for the near dynamic effects the equality of pressures which are exerted on the two surfaces of the wall. Thin sheets easy to weld, can be used for the walls 22 and 25.

The pump inverter 23, already mentioned, is entirely housed inside the casing 18. It recovers the fluid coming from the pump struts 12 to return it to the volute 24.

In the embodiment described and represented, this pump inverter 23 comprises a grille of curved blades 25 (FIG. 2) welded on the external face of the internal wall 20 of the casing 18. This inner wall 20 thus constitutes, locally, one of the faces of the channel of the pump inverter 23. The opposite face of the pump inverter 23 is constituted by a ring of sheet metal 26 integral with the separating wall 22. The available space is sufficient to permit the form of the blade 25 and of the ring 26 to be determined without other considerations except for that of ensuring a flow of fluid free of energy losses. The manufacture in thin sheet metal of this inverter, exposed to low mechanical forces, is of low cost.

One could also break down the grille blades 25 of the inverter into two successive grilles. The first, adjacent the pump strut circle 12, would annul the undesirable tangential component, of the flow, whilst the second, adjacent the boundary between the inverter 23 with the volute 24, would provoke the required tangential component. Between these two grilles the axial flow of fluid would be guided by the inner wall 20 of the casing 18 and by a coaxial separating wall. This member of annular channel of the inverter could widen progressively thus adding a supplementary diffuser in the layout of such a pump inverter.

Figure 4:
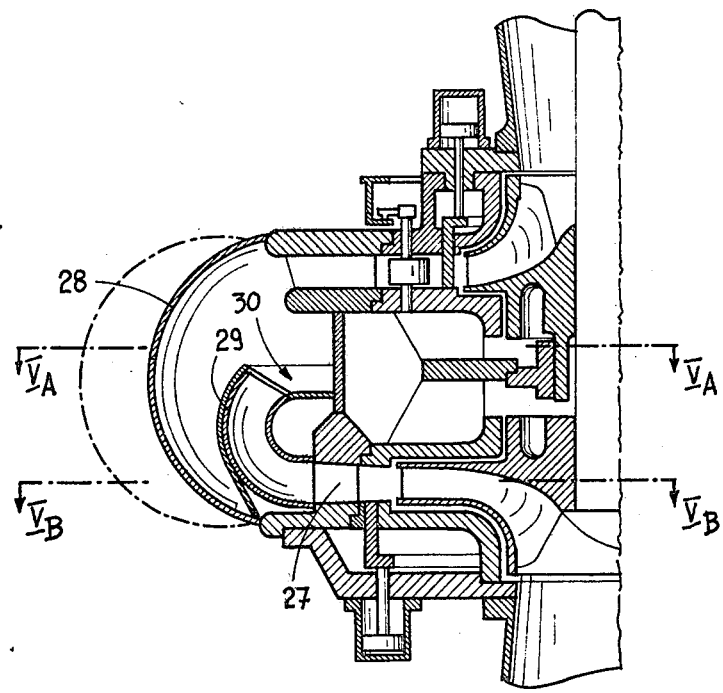
FIG. 4 is an axial section along the line IV—IV of FIG. 5 showing the first variation.
Figure 5:
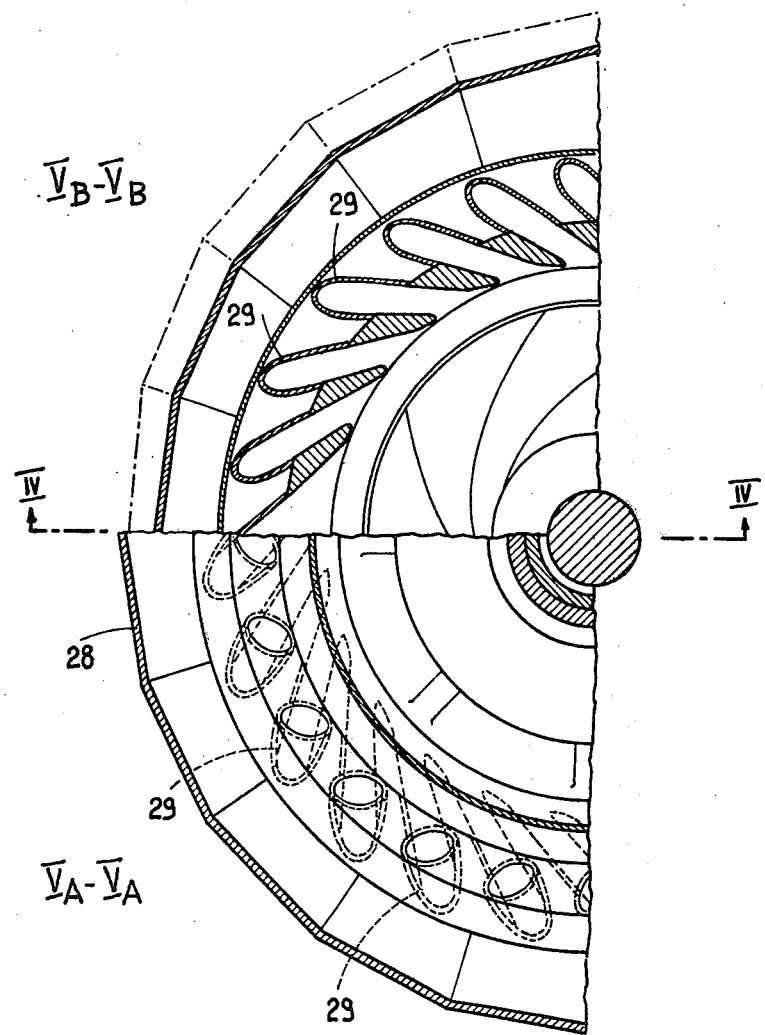
FIG. 5 is a view partially in transverse section along the lines $V_A$—$V_A$ and $V_B$—$V_B$ of FIG. 4.

Numerous variations of the form of embodiment described and respresented in FIGS. 1, 2 and 3 could again be envisaged:

In accordance with the variation represented in FIGS. 4 and 5, the circle of pump struts 27 is extended inside the casing 28 by several separate pipes 29. These pipes 29 form first of all a rectilinear diffuser, than incurved to discharge into the volute 30 giving the fluid the required tangential component.

Figure 6:
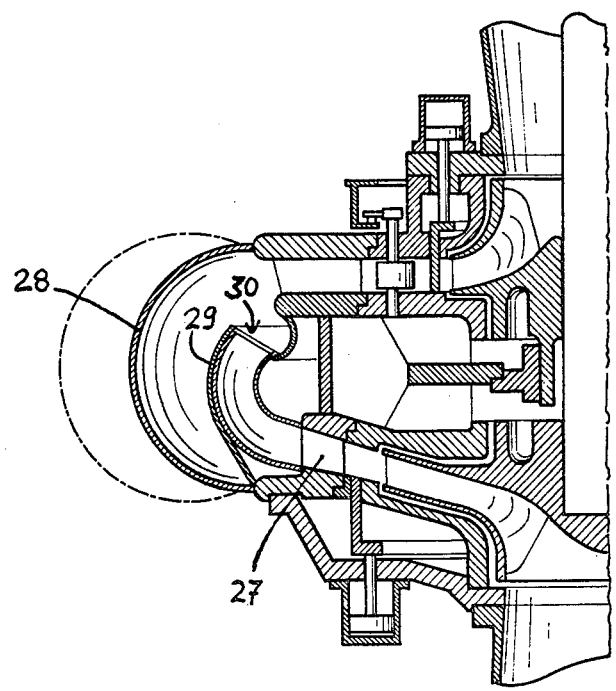
FIG. 6 is an axial section showing the variation applied in the case of a diagonal pump.

FIG. 6 shows the application of this same variant in the case of a diagonal pump.

It is to be noted that the different variations could be combined between each other. In particular the separate conduits could be extended by an annular channel coaxial with the interior wall of the casing.

The same geometrical assembly of tubes could also be disposed inside a cast body of revolution, the pipes of which are not separated or are only partially separated.

Figure 7:
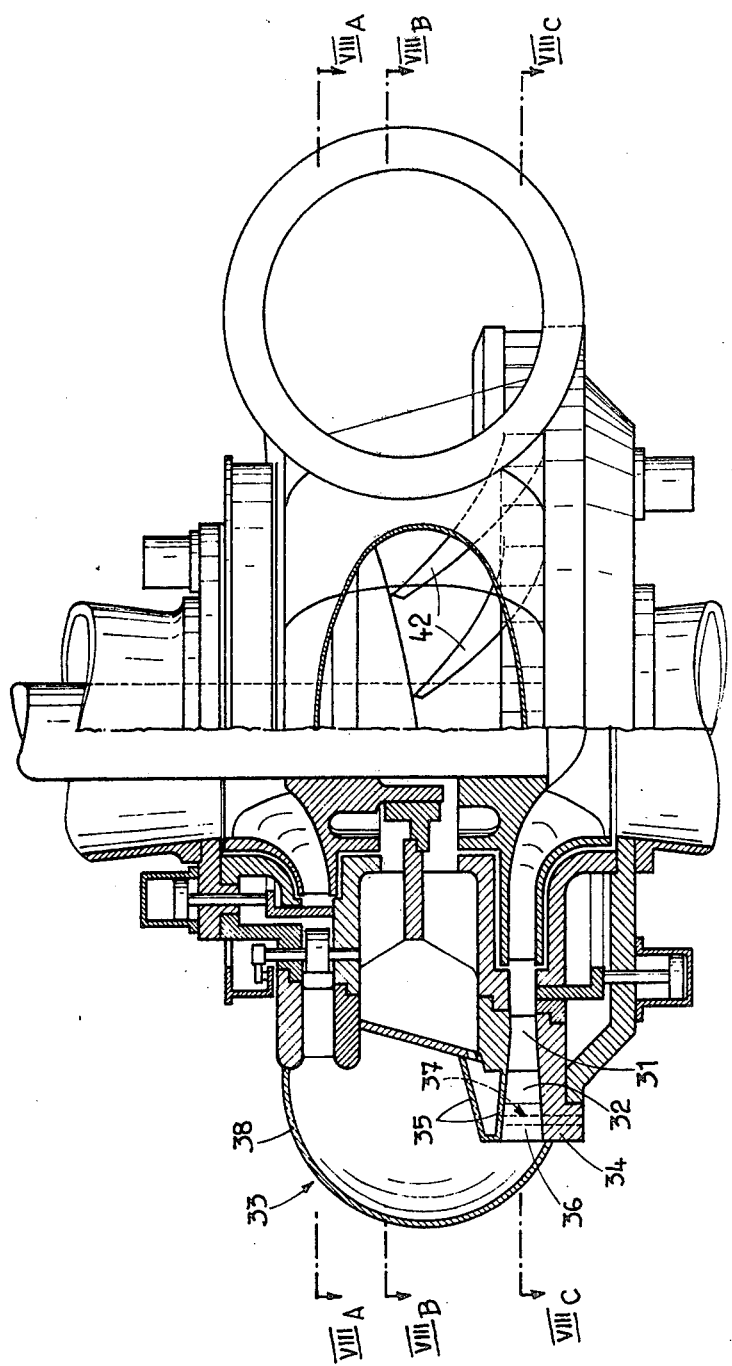
FIG. 7 is a view, partially in axial section along the line VII—VII of FIG. 8, and partially an elevation of a second variation.
Figure 8:
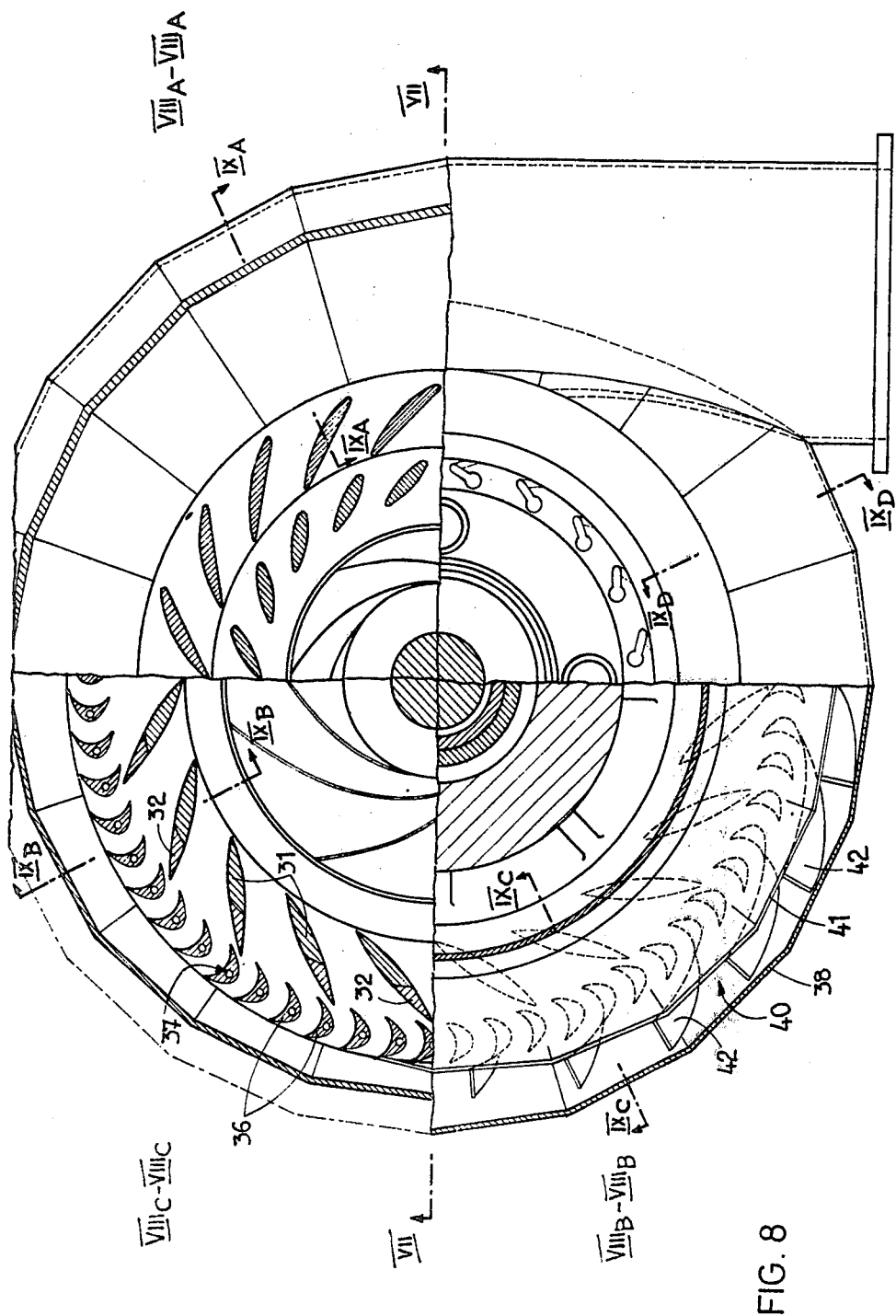
FIG. 8 is a transverse section respectively following the lines VIII$_A$—VIII$_A$, VIII$_B$—VIII$_B$ and VIII$_C$—VIII$_C$ of FIG. 7.
Figure 9A:
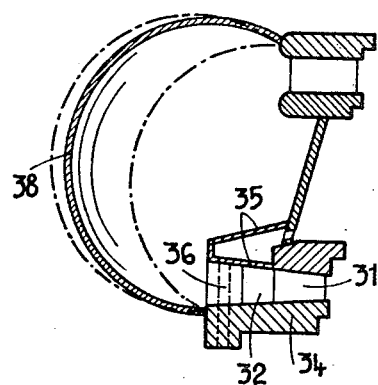
FIGS. 9A to 9D are respectively axial sections following the lines IX$_A$—IX$_A$, IX$_B$—IX$_B$, IX$_C$—IX$_C$ and IX$_D$—IX$_D$ of FIG. 8.
Figure 9B:
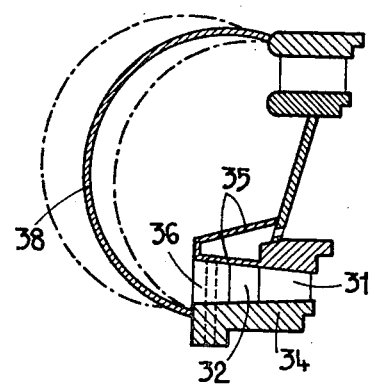
Figure 9C:
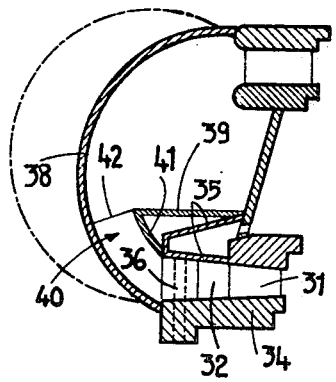
Figure 9D:
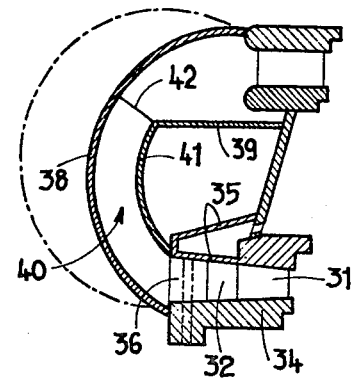

In accordance with the variation shown in FIGS. 7, 8 and 9, the diffusers of the pump strut circle are completed by an extension 32 of diffusers. This part of the diffusers is inserted inside the casing 33, between the external strut pump ring 34 and an annular separating wall 35.

The extension of diffusers 32 discharges in a grille of inversion blades 36 inserted between the members 34 and 35.

The thick blades envisaged for this type of inverter permit the provision of channels 37 ensuring the emptying of the leakages and of other functions.

The extension of the diffusers 32 and the blades of the reversing grille 36 could also be welded to the outside wall 38 of the casing 33.

The zone of the casing 33 rolled in a circle is more extended for this variation than for the preceding one (FIGS. 2 and 3). In fact, from a certain flattening, the section of the outer wall 38 of this casing disturbs the flow of fluid emerging from the reversing grille 36.

In the zone of the casing rolled in a circle, a connection wall 39 rises progressively its form being helical. The pump inverter 36 necessitates, in this region, the presence of an extension canal 40 (FIG. 9D), following the grille 36. The outer wall 38 of the casing locally constitutes the outer wall of the extension channel. This inner wall 41 is in the form of sections of thin sheet metal, concentric to the wall 38.

Water guides 42, inclined for conserving to the water emerging from the reversing grille 36 a direction favourable given thereby, ensure the rigidity of the assembly.

One could also form the reversing grille 36 of two successive grilles, as in the earlier arrangements.

For units of very large dimensions, it is possible to form the walls and the strut rings of the casing from several members assembled in situ, by ties or any other manner.

The turbine wheels or the pump wheels used in such a machine can be of the radial, diagonal or axial type.

The pump can comprise two stages and the turbine a single stage, likewise the pump and the turbine can be in multiple stages.

The principal technical and economic advantages brought by the present disposition with respect to known turbo-pumps, can be summarised as follows:

The invention allows the benefits of the advantages of pump inverters and of other improvements made to second generation turbo pumps to be utilised.

The conceived pump inverter could be of very differing types and avoid all strong mechanical pressures to which previous embodiments of inverters were submitted. Their manufacture in thin sheet metal, is of low cost.

The absence of the mechanical constraints and the provision of a space sufficient for the pump inverter permit these inverters to be incorporated without comprising other features and which utilises the shapes giving the smallest energy losses. The yield in pumping conditions are noticably improved.

The central composite body, the large and costly member of second generation turbo-pumps is avoided, similarly, the openings effecting the solidity of the spiral casing of these preceding machines. In the assembly thus, a large economy in manufacture is obtained.

I claim:

1. A hydraulic machine having a turbine and a pump orientated for the same direction of rotation and comprising a casing connected to an upper inlet pipe, blades interposed between the casing and the turbine and pump wheels, the turbine and the pump being mounted, spaced one from the other, on a common shaft and their respective inlets being orientated in opposite directions, and including a pump inverter housed at least partially inside the casing which is provided with an internal separating wall dividing it into two chambers, one of which constitutes the volute of the turbine into which the pump inverter discharges.

2. A hydraulic machine in accordance with claim 1, in which the casing is constituted by an outer wall extending from an external strut ring of the turbine to an external strut ring of the pump, and by an inner wall extending from an internal strut ring of the turbine to an internal strut ring of the pump.

3. A hydraulic machine in accordance with claim 1, in which the pump inverter housed at least partially in the casing, is separated from the volute contained therein by the separating wall.

4. A hydraulic machine in accordance with claim 1, in which the casing has a zone of variable section and a zone of constant section.

5. A hydraulic machine in accordance with claim 4, in which the said internal separating wall comprises a connecting wall housed in the zone of constant section of the tank, so as to form the said volute and to ensure the continuity of the evolution of the section law of the volute such as the requirements of hydraulic laws for correct supply of the turbine wheel.

6. A hydraulic machine in accordance with claim 2, in which the interior or exterior wall of the casing locally forms one of the faces of the channels of the pump inverter and/or one of the faces of a conduit member operating as a diffuser.

7. A hydraulic machine in accordance with claim 6, in which a fraction of the diffusers extending the pump struts and the reversing channels proper are constituted by tubes totally or partially independent one from the other.

* * * * *